United States Patent [19]
Joffe

[11] Patent Number: 6,014,367
[45] Date of Patent: Jan. 11, 2000

[54] METHOD FOR WEIGHTED FAIR QUEUING FOR ATM CELL SCHEDULING

[75] Inventor: Alexander Joffe, Palo Alto, Calif.

[73] Assignee: MMC Networks, Inc, Sunnyvale, Calif.

[21] Appl. No.: 08/843,108

[22] Filed: Apr. 25, 1997

[51] Int. Cl.$^7$ .................................................. H04J 3/02
[52] U.S. Cl. ........................ 370/230; 370/399; 370/412; 370/468
[58] Field of Search .................................. 370/230, 232, 370/235, 412, 415, 418, 234, 468

[56] References Cited

U.S. PATENT DOCUMENTS

| | | | |
|---|---|---|---|
| 2,686,844 | 8/1954 | Brewer | 179/81 |
| 4,885,744 | 12/1989 | Lespagnol et al. | 370/94 |
| 5,062,106 | 10/1991 | Yamazaki et al. | 370/94.1 |
| 5,136,584 | 8/1992 | Hedlund | 370/94.1 |
| 5,231,633 | 7/1993 | Hluchyj et al. | 370/412 |
| 5,233,606 | 8/1993 | Pashan et al. | 370/85.6 |
| 5,311,509 | 5/1994 | Heddes et al. | 370/60 |
| 5,337,308 | 8/1994 | Fan | 370/60 |
| 5,390,184 | 2/1995 | Morris | 370/94.2 |
| 5,457,687 | 10/1995 | Newman | 370/85.3 |
| 5,517,495 | 5/1996 | Lund et al. | 370/60 |
| 5,528,588 | 6/1996 | Bennett et al. | 370/60 |

(List continued on next page.)

FOREIGN PATENT DOCUMENTS

| | | | |
|---|---|---|---|
| WO 95/20282 | 7/1995 | WIPO | H04L 12/46 |
| WO 95/32570 | 11/1995 | WIPO | H04L 12/56 |

OTHER PUBLICATIONS

Hongqing Li et al. "A Simulation Study of TCP Performance in ATM Networks With ABR and UBR Services" *Proceedings vol. 3, 1996 IEEE Infocom '96, Fifteenth Annual Joint Conference of the IEEE Computer and Communications Societies*, Mar. 24–28, 1996, pp. v–xvi and pp. 1269–1276 (21 pages total including cover page).

Allyn Romanow et al. "Dynamics of TCP Traffic Over ATM Networks" *IEEE Journal on Selected Areas in Communications*, vol. 13, No. 4, pp. 633–641, May 1995.

Alan Demers et al. "Analysis and Simulation Of A Fair Queueing Algorithm" ©1989 ACM, pp. 1–12.

"ATMS2003B Switch Controller 1 'White'", *MMC Networks*, Dec. 1995, 32 pages.

Beraldi, R., et al: "Selective BECN Schemes for Congestion Control of ABR Traffic in ATM LAN", *1996 IEEE Int'l Conf. on Communications (ICC), Converging Technologies for Tomorrow's Applications*, Dallas, Jun. 23–27, 1996. pp. 503–507.

Ozveren, C., et al: "Reliable and Efficient Hop–By–Hop Flow Control", *Computer Communications Review*, vol. 24, No. 4, Oct. 1, 1994, pp. 89–100.

Hongqing, Li, et al.: "Performance of TCP Over UBR Service in ATM Networks With Per–VC Early Packet Discard Schemes" *Proceedings of the 1996 IEEE 15th Annual Int' Phoenix Conf. on Computers and Communication*, Mar. 27–29, 1996, pp. 350–357.

Tanenbaum, "Computer Networks", Prentice Hall, Inc., The Physical Layer, pp. 148–150 (1996).

Dutton, et al., "Asynchronous Transfer Mode (ATM)", Second Edition, Oct. 1995, International Business Machines Corporation, pp. 3–1 through 3–25 and 9–1 through 9–34.

Flanagan, "ATM Asynchronous Transfer Mode User's Guide", Braking Frames Into Cells, pp. 25–49, (1994).

*Primary Examiner*—Min Jung
*Attorney, Agent, or Firm*—Skjerven, Morrill, McPherson, Franklin and Friel; David Heid; Fabio E. Marino

[57] ABSTRACT

A method is provided for the implementation of a fair queuing ATM cell scheduler that can precisely pace virtual channel (VC) traffic by an assigned weight which defines the available bandwidth to be allocated to that VC. The method provides a minimum service rate to each virtual channel on a small, selected time scale, and requires only a small, bounded amount of work per physical connection, independent of the number of VCs.

12 Claims, 8 Drawing Sheets

U.S. PATENT DOCUMENTS

| | | | |
|---|---|---|---|
| 5,533,009 | 7/1996 | Chen | 370/232 |
| 5,541,912 | 7/1996 | Choudhury et al. | 370/17 |
| 5,555,264 | 9/1996 | Sällberg et al. | 370/17 |
| 5,557,611 | 9/1996 | Cappellari et al. | 370/60.1 |
| 5,583,863 | 12/1996 | Darr, Jr. et al. | 370/397 |
| 5,592,476 | 1/1997 | Calamvokis et al. | 370/390 |
| 5,629,928 | 5/1997 | Calvignac et al. | 370/237 |
| 5,633,859 | 5/1997 | Jain et al. | 370/234 |
| 5,633,867 | 5/1997 | Ben-Nun et al. | 370/399 |
| 5,638,371 | 6/1997 | Raychaudhuri et al. | 370/347 |
| 5,689,508 | 11/1997 | Lyles | 370/391 |
| 5,704,047 | 12/1997 | Schneeberger | 395/200.65 |
| 5,715,250 | 2/1998 | Watanabe | 370/395 |
| 5,719,853 | 2/1998 | Ikeda | 370/229 |
| 5,748,629 | 5/1998 | Caldara et al. | 370/389 |
| 5,751,951 | 5/1998 | Osborne et al. | 395/200.8 |
| 5,771,234 | 6/1998 | Wu et al. | 370/418 |
| 5,809,024 | 9/1998 | Ferguson et al. | 370/395 |

METHOD FOR WEIGHTED FAIR QUEUING FOR ATM CELL SCHEDULING

BACKGROUND OF THE INVENTION

1. Field of the Invention

The invention relates to cell scheduling in Asynchronous Transfer Mode (ATM) networks, and more specifically to weighted fair queuing in ATM networks.

2. Background Art

Ideally, fair cell schedulers should continuously subdivide available bandwidth among competing virtual channels (VCs) according to their weights. While such an hypothetical scheduler has not been built, existing queuing methods try to approximate this model. However, the complexity of these methods, and the resulting processing time required, make them undesirable for high-speed ATM switches, which require a new cell to be selected for transmission every few microseconds. In addition, ATM switches often service tens of thousands of virtual channels, multiplexed onto a single physical link, with connection throughput requirements varying over a wide range, further compounding the requirement for fast scheduling methods.

Figure 1:
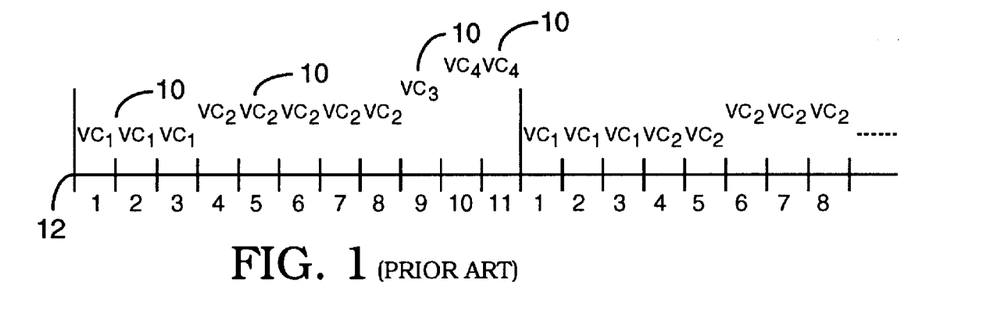
FIG. 1 shows a prior art fair scheduling scheme.

A simple prior art scheduling method is described in FIG. 1. According to the method of FIG. 1, each VC is allowed to transmit a burst equal to its weight. A variety of VC entries 10 are shown on timeline 12, indicating the order in which they are transmitted. Thus, if VC1 has a weight=3, VC2 has weight=5, VC3 has weight=1 and VC4 has weight=2, VC1 will transmit at times 1, 2 and 3, VC2 will transmit at times 4, 5, 6, 7 and 8, VC3 will transmit at time 9 and VC4 will transmit at times 10 and 11.

SUMMARY OF THE INVENTION

The present invention provides an easy to implement method for fair weighted ATM scheduling, which allows for a large number of weights to support a large number of VCs.

Unlike prior art schedulers which use simple scheduling schemes such as giving each VC a burst equal to its weight, the present invention provides a scheduling method which spreads out the burst of each VC to achieve the speed required for fast ATM scheduling, significantly improving network performance.

DETAILED DESCRIPTION OF THE INVENTION

Figure 2:
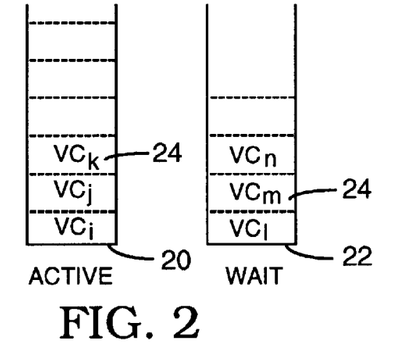
FIG. 2 illustrates the preferred embodiment of the present invention.

The present invention provides a method that improves over the simple scheduling scheme of FIG. 1, by spreading out each VC's burst. In FIG. 2, several VCs 24 are queued on active queue 20 and wait queue 22, waiting to be scheduled. Each VC 24 has a weight, which is used to determine the portion of available bandwidth assigned to that VC. In addition, a scaling coefficient S is defined equal to the maximum weight divided by the maximum burst allowed. The scaling coefficient is used to regulate the duration of individual bursts independently from the weight of the VCs.

Once the scaling coefficient has been defined, the weight W of each coefficient is divided by the scaling coefficient S and the result is rounded to the nearest integer. Initially, all VCs are placed in the active queue, while the wait queue is empty. The first VC is then removed from the queue and w cells to be transmitted on that VC are transmitted. The number of cells transmitted w is then subtracted from a counter initially set to a value equal to the weight of the VC. If the value of the counter is equal to zero, the VC is moved to the wait queue. Once all VCs have been moved to the wait queue, the wait queue becomes the active queue and the active queue becomes the wait queue, as shown in Table 1.

TABLE 1

Scheduling Process.

```
while (Active_Queue is not Empty)
{
  remove VC from Head of Queue;
  burst = VC->B;count = VC->C;
  while (burst != 0)
  {
    send_cell;
    burst--;
    count--;
    if (count == 0)
    {
      move VC to Wait_Queue;
      VC->C = W;
      break;
    }
  }
  if (count != 0)
  {
    add VC to Active_Queue;
    VC->C=count;
  }
}
switch (Active_Queue, Wait_Queue);
```

Figure 12:
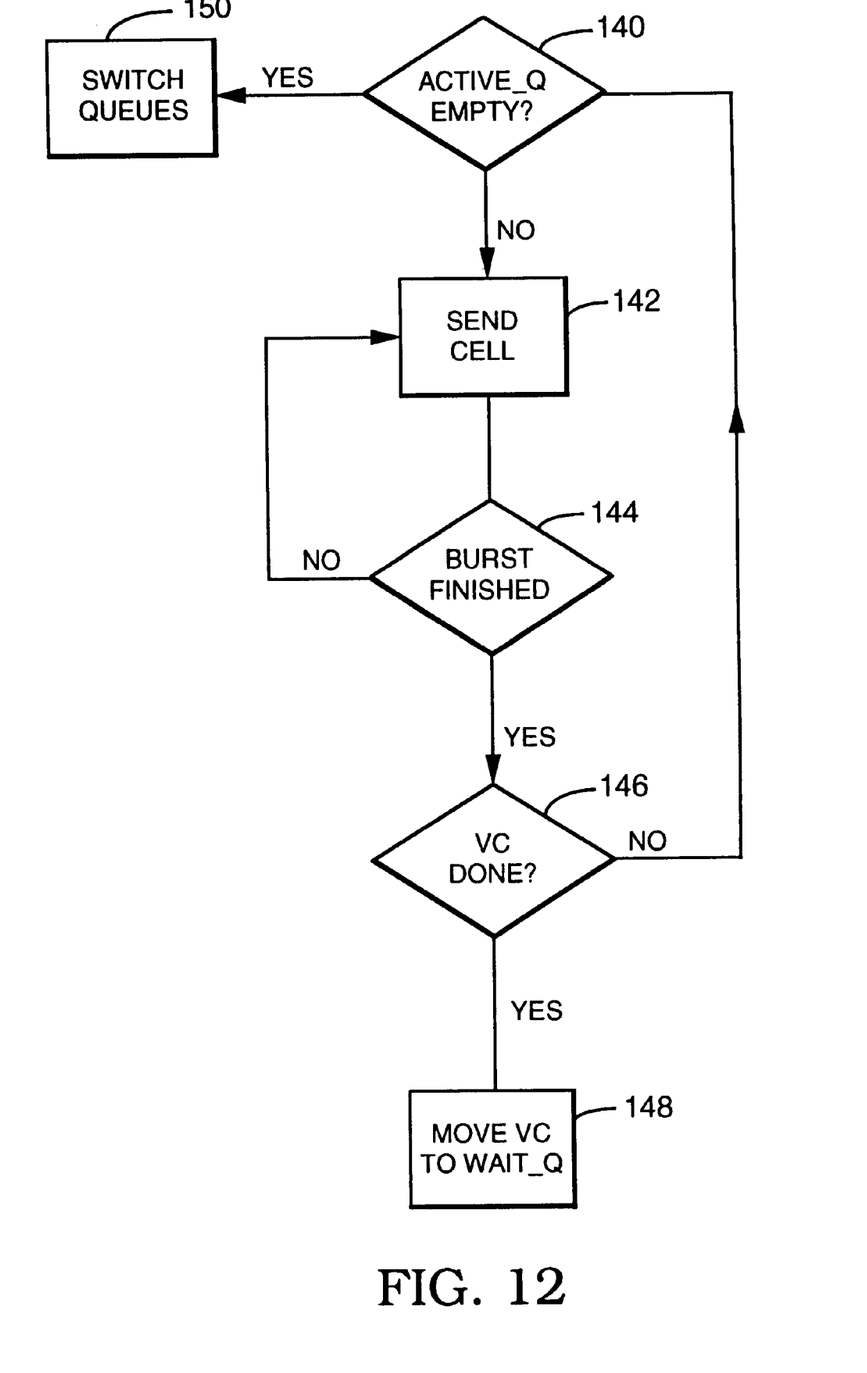
FIG. 12 is a flowchart diagram of the scheduling of VC cells.

The operation of Table 1 is further illustrated by the flow diagram of FIG. 12. Stage 140 first determines whether the active queue is empty, in which case the active queue and the wait queue are switched in stage 150; otherwise a cell is transmitted in stage 142. Stage 144 then determines whether the current burst is finished, in which case the operation proceeds to stage 146; otherwise stage 142 is repeated. Stage 146 determines whether the VC has used all of the bandwidth allocated to the VC, in which case the VC is moved to the wait queue in stage 148; otherwise stage 140 is repeated.

FIGS. 3A–4C illustrate an example of the functioning of the scheduling operation of the preferred embodiment. While the example of FIGS. 3A–4C uses four VCs, vc-1 32, vc-2 34, vc-3 36 and vc-4 38, for clarity, the invention is not limited to any number of VCs. In particular, the scheduling method of the present invention can be used to schedule an arbitrary number of VCs queued on an ATM switch. Vc-1 has a weight=3, vc-2 has weight=5, vc-3 has a weight=2 and vc-4 has weight=2, and the scaling coefficient is 2. The bust size of each VC is determined by dividing the weight of each VC by the scaling factor and rounding the result to the nearest integer. Thus, vc-1 has a burst of 1 cell, vc-2 has a burst of 2 cells, vc-3 has a burst of 1 cell and vc-4 has a burst of 2 cells.

Figure 3A:
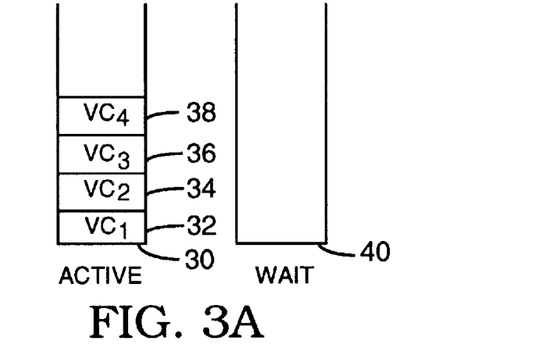
FIGS. 3A–3D illustrate the preferred embodiment at successive times during the scheduling process.
Figure 3B:
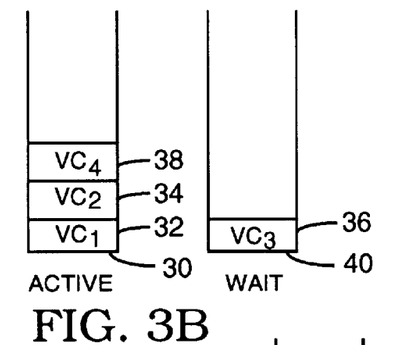

As shown in FIG. 3A, vc-1 32, vc-2 34, vc-3 36 and vc-4 38 are initially placed in active queue 30, while wait queue 40 is empty. Vc-1 32 is then serviced and a single vc-1 cell 44 is transmitted on transmission line 42. A counter on vc-1 32 is decreased by one to indicated that one cell of vc-1 32 has been transmitted. As the value of the vc-1 counter is greater than zero (3−1=2), vc-1 32 remains on the active queue 30 and vc-2 34 is serviced. Two vc-2 cells 46 are transmitted on transmission line 42 and the vc-2 counter is decreased by two. As the value of the vc-2 counter is greater than zero (5−2=3), vc-2 34 remains on the active queue 30 and vc-3 36 is serviced. A single vc-3 cell 48 is transmitted on transmission line 42 and the vc-3 counter is decreased by one. As the value of the vc-3 counter is equal to zero (1−1=0), vc-3 36 is transferred to the wait queue 40, as shown in FIG. 3B. Finally, vc-4 38 is serviced and a single vc-4 entry 50 is transmitted on transmission line 42. As the value of the vc-4 counter is greater than zero (2−1=1), vc-4 remains on the active queue 30, thus concluding the first round of scheduling.

Figure 3C:
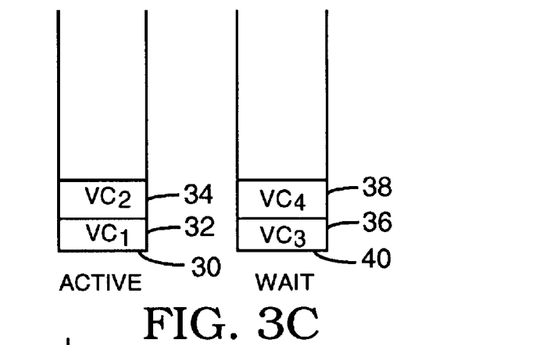
Figure 3D:
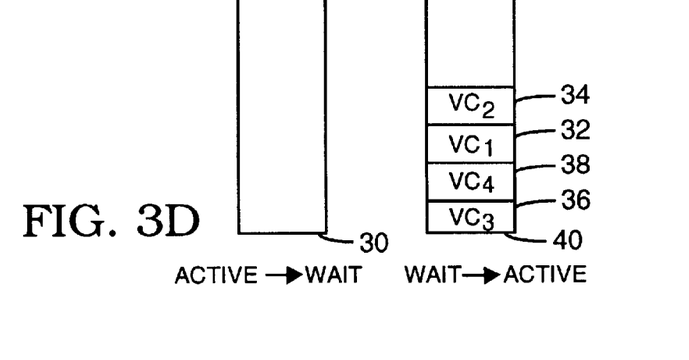
Figure 4A:
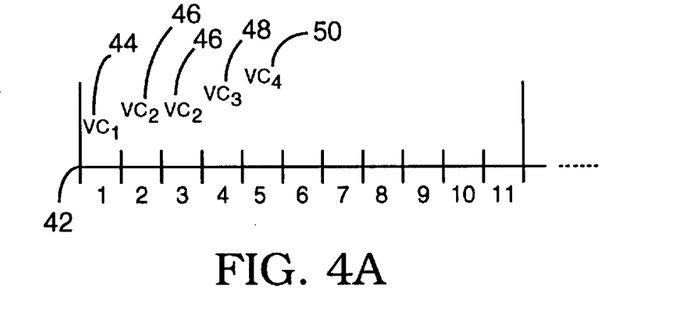
FIGS. 4A–4C show the scheduling scheme of the preferred embodiment at successive times during the scheduling process.
Figure 4B:
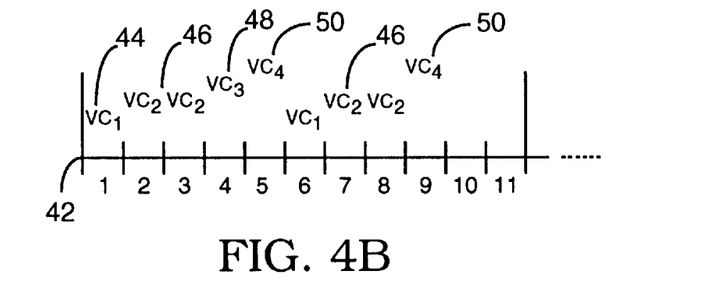
Figure 4C:
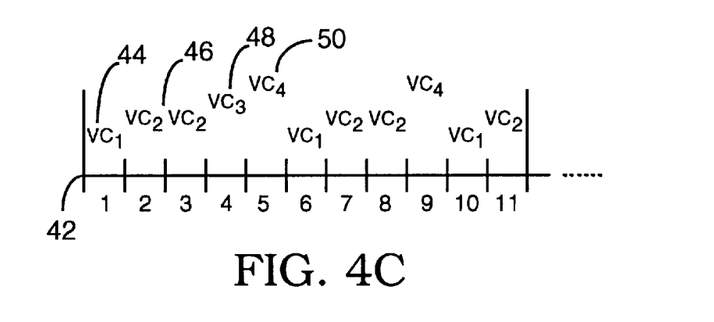

FIGS. 3B and 4B illustrate the second and third rounds of scheduling, at the end of which vc-4 38 is on the wait queue 40. FIGS. 3C and 4C illustrate the fourth, fifth and sixth rounds of scheduling, at the end of which all VCs are on the wait queue 40. Once the active queue 30 is empty, the active queue 30 becomes the wait queue and the wait queue 40 becomes the active queue, as shown in FIG. 3D.

Figure 5:
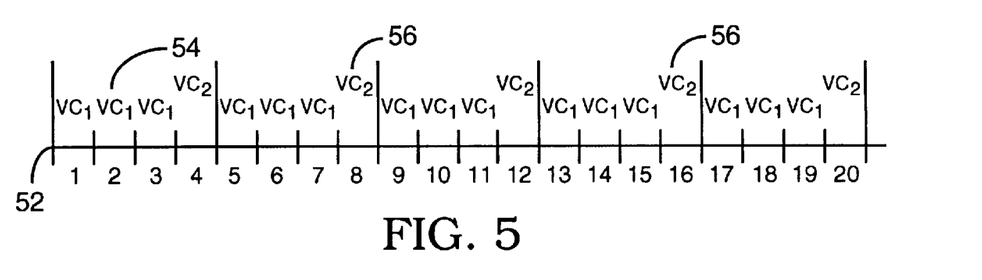
FIG. 5 illustrates the scheduling scheme of the preferred embodiment at the end of a scheduling cycle.

FIG. 5 illustrates another example of the functioning of the scheduling method of the preferred embodiment. In FIG. 5, vc-1 has a weight of 15, vc-2 has a weight of 5, and the scaling coefficient is 4. As a result, vc-1 has a burst length of 3 cells and vc-2 has a burst length of 1 cell. Thus, in each round of scheduling 3 vc-1 cells 54 and 1 vc-2 cells 56 are transmitted on transmission line 52.

Figure 6:
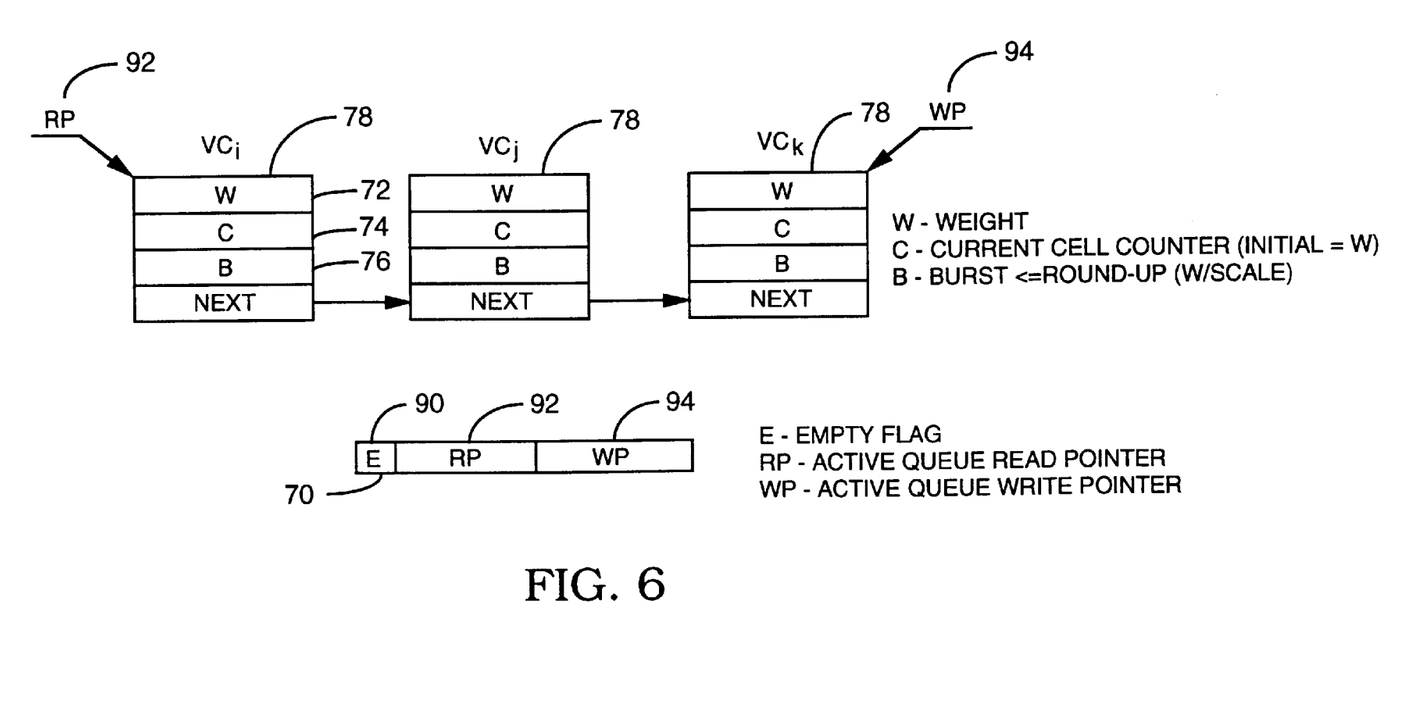
FIG. 6 is a block diagram of one embodiment of the present invention.

FIG. 6 illustrates the structure of the active queue and the wait queue components of the present invention. Each queue consists of a register 70, which contains an empty flag 90, a read pointer 92 and a write pointer 94. Both read pointer 92 and write pointer 94 point to additional registers containing the parameters corresponding to the VCs stored on the queue. Each VC register 78 contains a weight 72, a counter 74 and a burst size 76.

Figure 7:
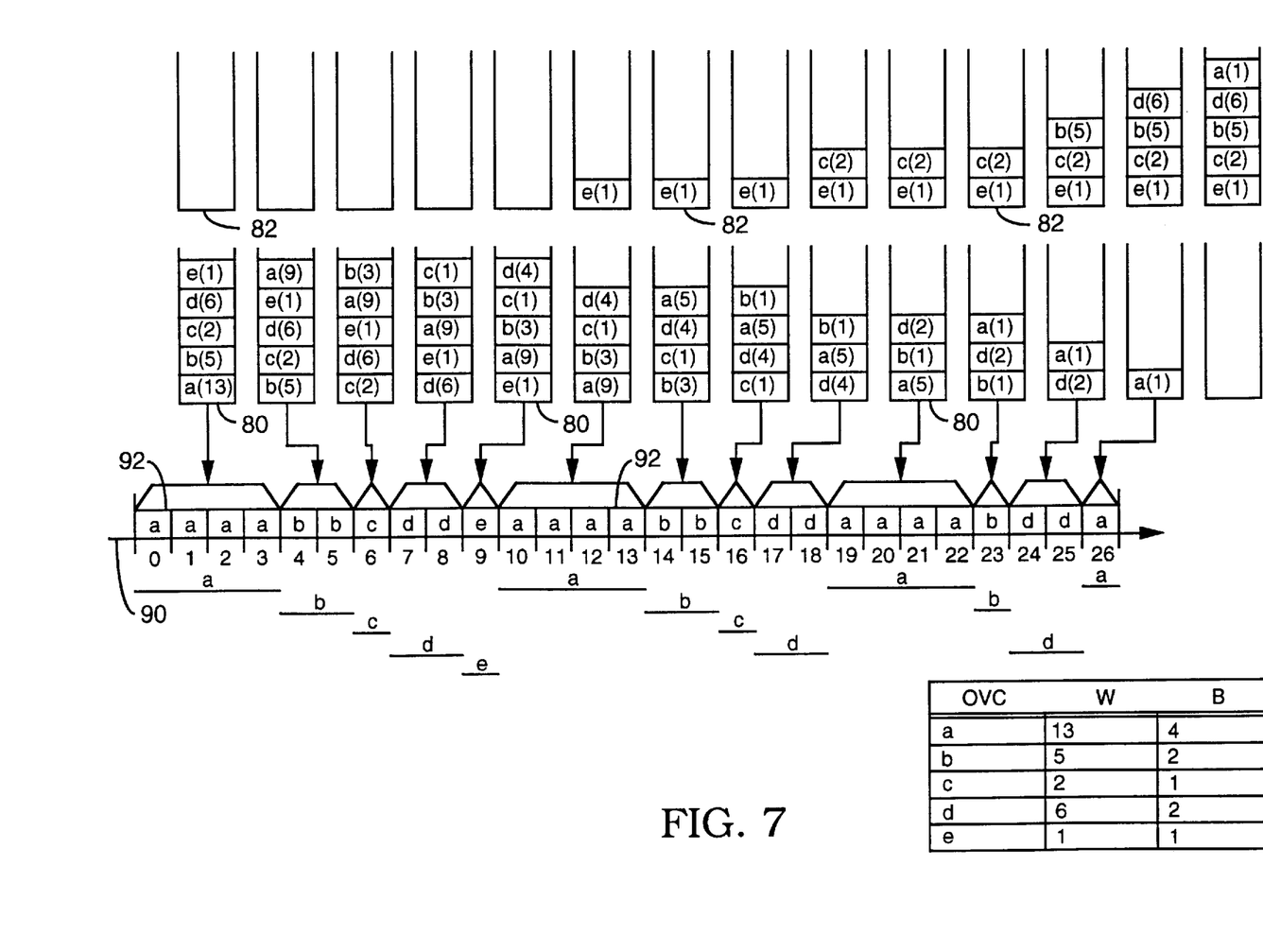
FIG. 7 shows an example of the scheduling scheme of the preferred embodiment.

FIG. 7 illustrates a further example of the operation of the scheduler of the preferred embodiment. At time 0 on timeline 90, five VCs, a, b, c, d and e, are scheduled for servicing on active queue 80. Accordingly, a has a weight of 13 and a burst of 4 cells, b has a weight of 5 and a burst of 2 cells, c has a weight of 2 and a burst of 1 cell, d has a weight of 6 and a burst of 2 cells, and e has a weight of 1 and a burst of 1 cell. The value of the counter at each point on timeline 90 is shown in parenthesis next to each VC.

At times 0–3 4 a-cells are transmitted and the a-counter is decreased to 9. At times 4–5, 2 b-cells are transmitted and the b-counter is decreased to 3. At time 6, 1 c-cell is transmitted and the c-counter is decreased to 1. At times 7–8, 2 d-cells are transmitted and the d-counter is decreased to 4. At time 9, 1 e-cell is transmitted, the e-counter is decreased to 0, and e is moved to the wait queue 82. At times 10–13, 4 a-cells are again transmitted and the a-counter is decreased to 5. At times 14–15, 2 b-cells are transmitted and the b-counter is decreased to 1. At time 16, one c-cell is transmitted, the c-counter is decreased to 0 and c is moved to the wait queue 82. At times 17–18, 2 d-cells are transmitted and the d-counter is decreased to 2. At times 19–22, 4 a-cells are again transmitted and the a-counter is decreased to 1. At time 23, 1 b-cell is transmitted, the b-counter is decreased to 0, and b is moved to the wait queue 82. At times 24–25, 2 d-cells are transmitted, the d-counter is decreased to 0, and d is moved to the wait queue 82. Finally, at time 26, 1 a-cell is again transmitted, the a-counter is decreased to 0 and a is moved to the wait queue 82. As all VCs have been moved to the wait queue 82 (and the active queue 80 is empty), wait queue 82 becomes the active queue and active queue 80 becomes the wait queue and the scheduling operation is repeated.

Figure 8:
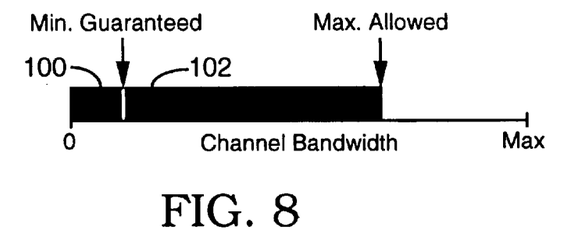
FIG. 8 is a two-dimensional graph representing the relationship between a minimum guaranteed bandwidth and a maximum allowed bandwidth in a multiple scheduler embodiment of the present invention.

Furthermore, multiple schedulers may be used in parallel to implement particular arbitration/priority schemes. For example, one might want to assign to a virtual channel a minimum guaranteed bandwidth, but at the same time limit the maximum bandwidth that can be taken by each VC at any particular time. FIG. 8 illustrates the relationship between the minimum guaranteed bandwith 100 and the maximum allowed bandwidth 102. This scheme is accomplished using two schedulers operating in parallel, with one scheduler having priority over the other scheduler.

Figure 9:
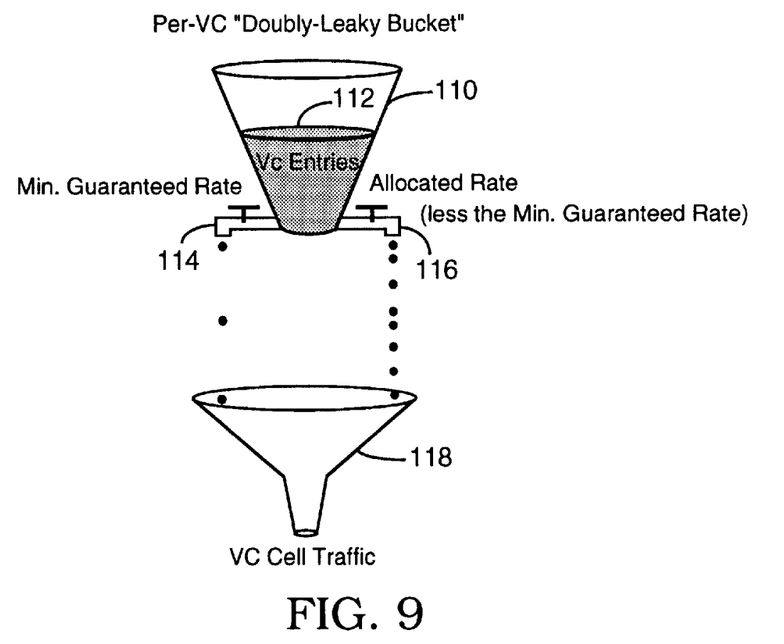
FIG. 9 illustrates a "doubly leaky bucket."

This scheme can also be described by analogy to the "doubly leaky bucket" of FIG. 9. Bucket 110 is filled with liquid 112. Faucets 114 and 116 allow liquid 112 to drain into funnel 118 at different rates. If faucet 114 is set to a rate corresponding to the minimum guaranteed bandwith 100 (shown in FIG. 8) and faucet 116 is set to a rate corresponding to the difference between the maximum allowed bandwith 102 and the minimum guaranteed bandwith 100 (shown in FIG. 8), liquid 112 will drain into funnel 118 in a fashion analogous to that illustrated in FIG. 8. Thus, on a conceptual level the scheduling method of the present invention operates similarly to the theoretical doubly leaky bucket of FIG. 8.

Figure 10:
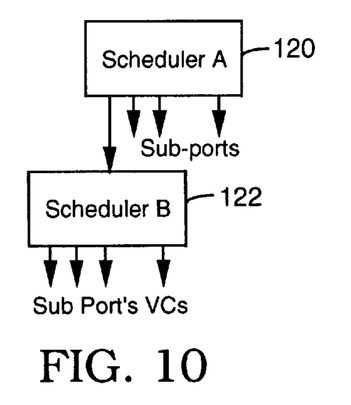
FIGS. 10–11 show of multiple scheduler embodiments of the present invention.

In addition, several lower bandwidth channels may be multiplexed onto a single, higher bandwidth channel by using multiple schedulers, as shown in FIG. 10. In FIG. 10, scheduler 120 is used to subdivide bandwidth among several low bandwidth channels and scheduler 122 is used to assign the appropriate bandwidth to each channel's VCs.

Figure 11:
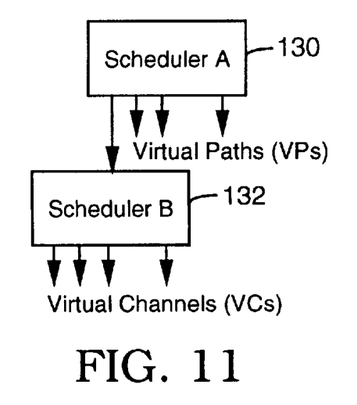

Furthermore, several VCs may be carried over a single virtual path (VP). In FIG. 11, scheduler 130 is used to provide the appropriate bandwidth to several VPs, while scheduler 132 is used to provide appropriate bandwidth to the VCs in one of the VPs.

Figure 13:
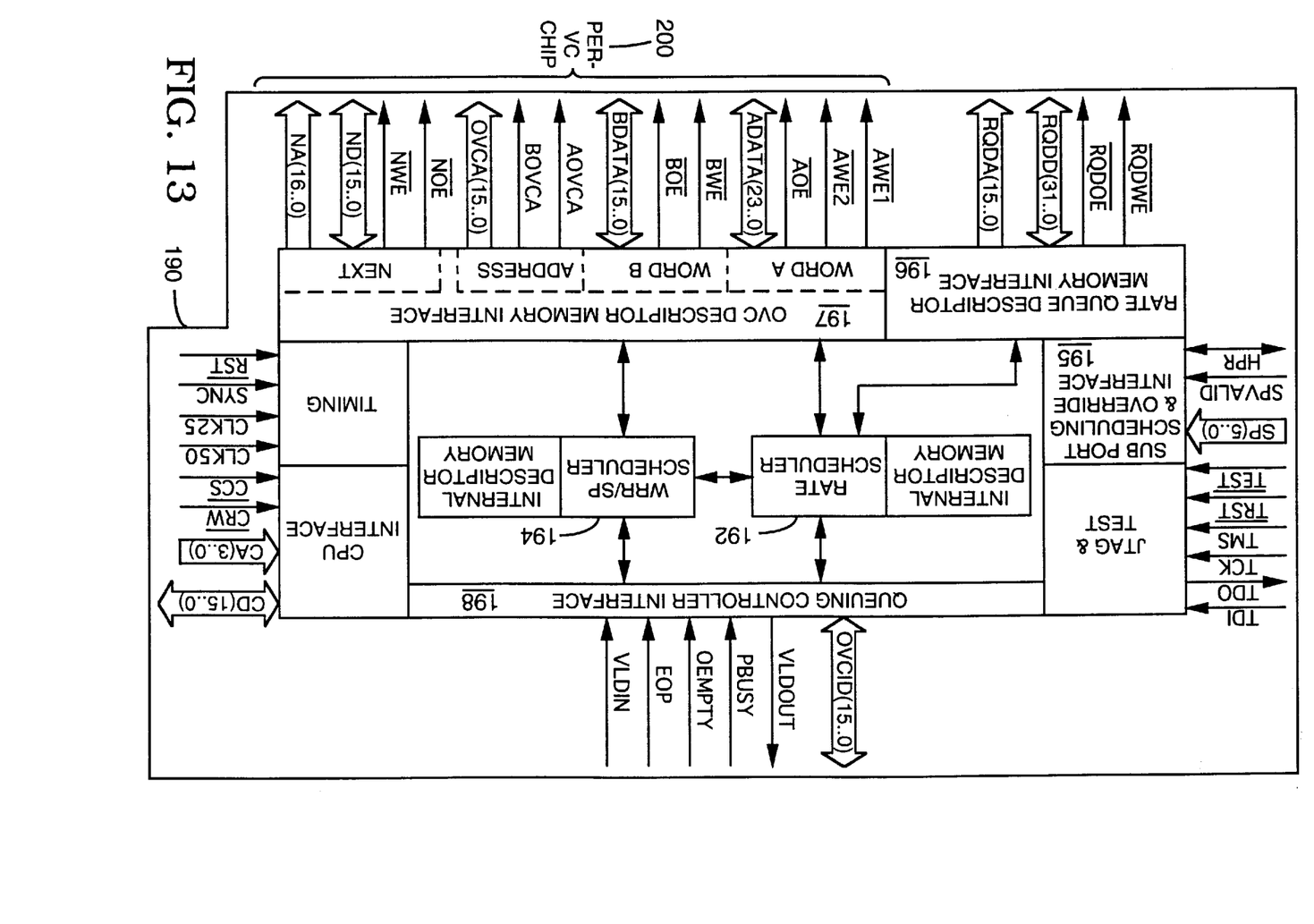
FIG. 13 is a block diagram of an integrated circuit for scheduling of ATM cells, according to one embodiment of the invention.

A block diagram of an integrated circuit for ATM cell scheduling according to one embodiment of the invention is shown in FIG. 13. ATM cell scheduler 190 comprises a time-wheel scheduler 192, as well as a weighted round robin/ strict priority scheduler 194.

Time-wheel schedulers are described copending, commonly assigned U.S. patent application Ser. No. 08/845,710, entitled "TIME-WHEEL ATM CELL SCHEDULING" by Alexander Joffe and Ari Birger and having attorney docket No. M-3816 US, which is incorporated herein by reference in its entirety.

ATM cell scheduler 190, further includes a subport scheduling interface module 195, a queue rate descriptor memory interface module 196, an OVC descriptor memory interface 197 and a queuing controller interface 198. A listing of signals received and transmitted by ATM cell scheduler 190 and their corresponding pins is provided in Appendix A.

Figure 14:
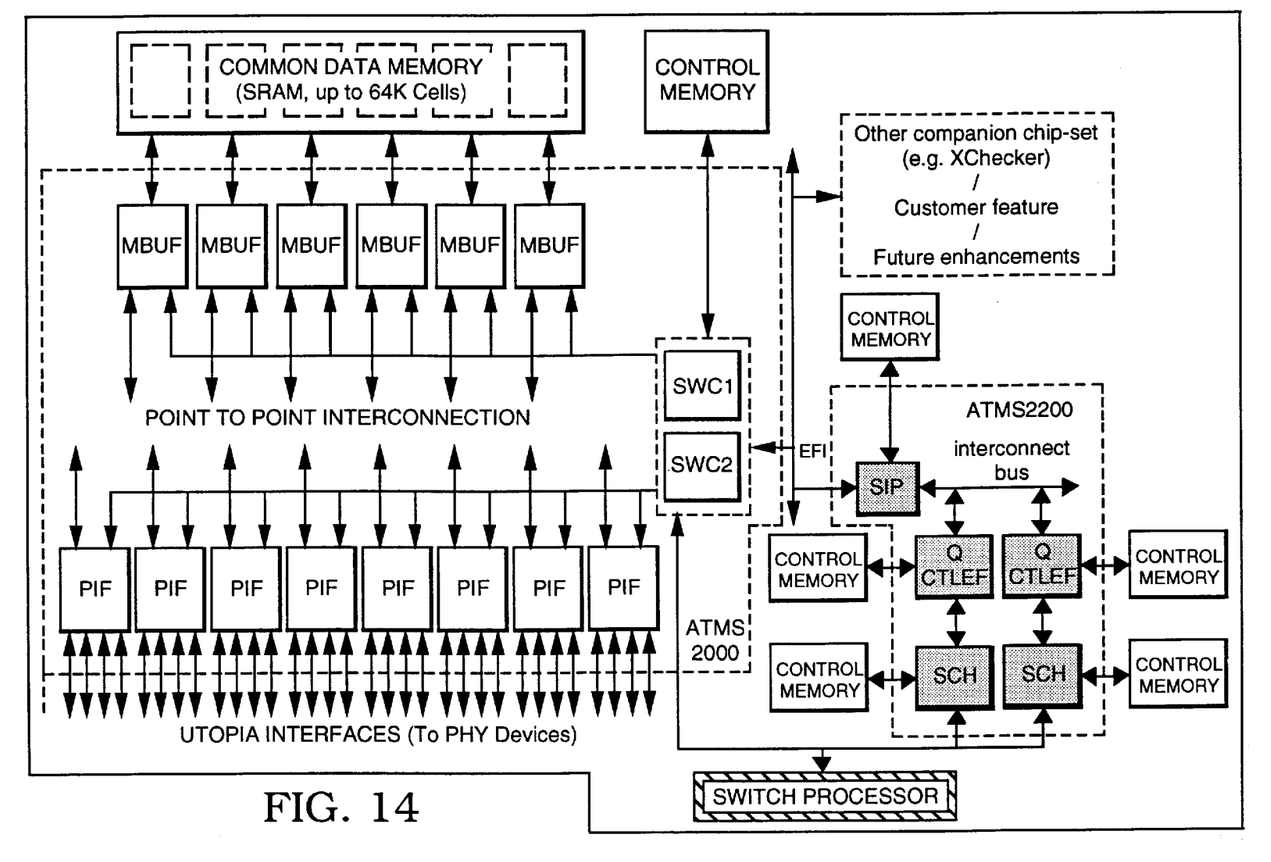
FIG. 14 is a block diagram of an ATM switch according to one embodiment of the invention.

ATM cell scheduler 190 interfaces with Per-VC circuit 200 via OVC descriptor memory interface 197. Per-VC circuit 200 includes storage for data structures representing VC cells. By exchanging signals with Per-VC circuit 200 according to a predetermined protocol, ATM cell scheduler 190 controls the scheduling of ATM cells queued on the ATM switch of FIG. 14. FIG. 14 illustrates the structure of an ATM switch according to the present invention. Switch controllers 220 interface through switch interface 210 with per-VC circuits 200. Per-VC circuits 200 exchange signals with schedulers 190 to perform the scheduling of ATM cells for transmission. The ATM switch of FIG. 20 is described in co-pending, commonly assigned U.S. patent application Ser. No. 08/706,104, filed Aug. 30, 1996, entitled "CELL QUEUING IN ATM SWITCHES" by Alexander Joffe, Ari Birger and Pravat Mishra, having attorney docket No. M-4177 US, which is incorporated herein by reference in its entirety.

I claim:

1. A method of operating a cell scheduler for performing asynchronous time mode transfer of virtual channel cells, the scheduler including a wait queue and an active queue, the method comprising:

assigning a weight to a virtual channel having a plurality of cells queued on the active queue;

scheduling a plurality of cells of the virtual channel queued on the active queue for transmission;

moving all cells of the virtual channel queued on the active queue to the wait queue;

the wait queue becoming the active queue; and the active queue becoming the wait queue.

2. The method of claim 1, further comprising:

transmitting a cell scheduled for transmission; and repeating the transmission step if the number of cells transmitted is less than a predetermined burst length of the virtual channel.

3. The method of claim 1, further including determining whether the active queue is empty.

4. The method of claim 3, wherein the wait queue becomes the active queue only if the active queue is empty.

5. The method of claim 2, wherein the burst length is generated by dividing the weight assigned to the virtual channel by a scaling coefficient and rounding the result to the next lowest integer.

6. The method of claim 2, wherein the burst length is generated by dividing the weight assigned to the virtual channel by a scaling coefficient and rounding the result to the next highest integer.

7. The method of claim 5, wherein the scaling coefficient is determined by dividing a highest weight of the virtual channels queued on the active queue by a predetermined maximum burst length.

8. The method of claim 6, wherein the scaling coefficient is determined by dividing a highest weight of the virtual channels queued on the active queue by a predetermined maximum burst length.

9. A scheduling system to be used in asynchronous time mode transfer of virtual channel entries, the system comprising first and second cell schedulers, the first cell scheduler having a first priority and the second cell scheduler having a second priority, lower than the first priority, the first and second cell schedulers both comprising:

an active queue and a wait queue; and means for transferring virtual channel entries between the active queue and the wait queue;

wherein cells scheduled for transmission by the first scheduler are transmitted prior to cells scheduled for transmission by the second scheduler.

10. The system of claim 9, further comprising one or more Virtual Channels (VCs).

11. The system of claim 9, wherein each of the queues further comprises zero or more VC entries.

12. The system of claim 10, wherein each of the VCs is assigned a weight and a burst length.

* * * * *